Aug. 18, 1959 N. C. DAHL 2,900,613
UNBONDED ELECTRIC STRAIN GAGE
Filed May 8, 1957 2 Sheets-Sheet 1

Inventor
Norman C. Dahl
by E. R. Hulbert
Atty.

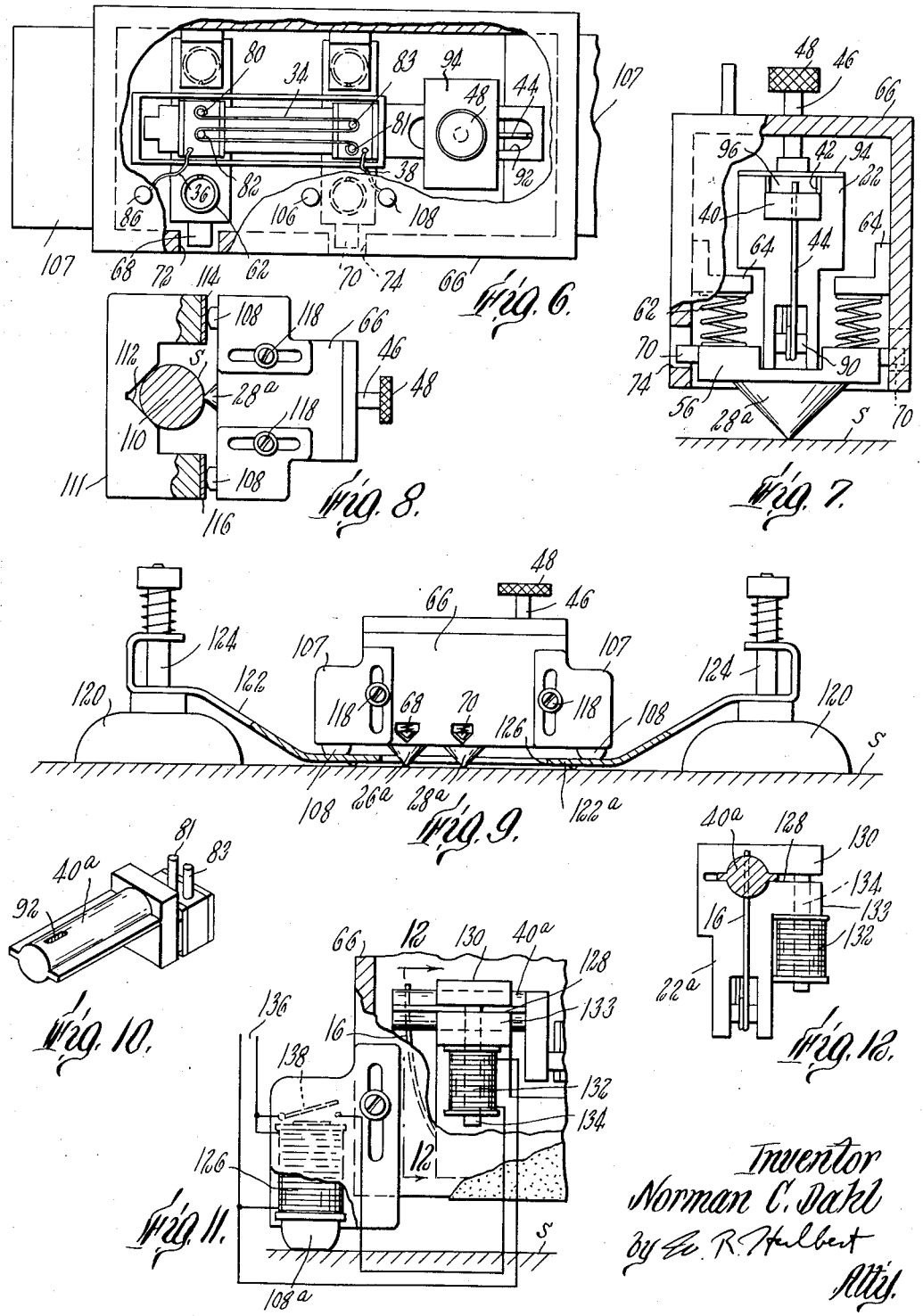

United States Patent Office 2,900,613
Patented Aug. 18, 1959

2,900,613

UNBONDED ELECTRIC STRAIN GAGE

Norman C. Dahl, Lexington, Mass.

Application May 8, 1957, Serial No. 657,779

9 Claims. (Cl. 338—6)

This invention relates to strain gages and is more particularly concerned with a new and improved resistance type gage of the unbonded type.

The usual method today, for measuring strain on the surface of bodies is to use the so-called bonded wire resistance strain gage. These gages contain a length of fine wire arranged so that almost all of this length is parallel to a given line in the gage. The wire is held between very thin sheets of suitable material. In practice the gage is cemented to the surface of the body whose displacement is to be measured with the axis of the wire parallel to the direction in which it is desired to measure the strain. When the cement has hardened the surface is strained. The strain gage is therefore correspondingly strained and due to this the resistance of the wire changes. The strain is then calculated from the measured resistance change. After the test the gage is discarded since it is not practical to remove it for reuse on another surface.

These bonded wire strain gages have been developed to a very high degree and are used extensively and with great success. There are, however, two aspects of their use which present some difficulty. The first of these is that it requires a considerable time for the cement to harden properly. This means that a test cannot begin immediately upon aplication of the gage. Also, a reasonable length of time is required to prepare the surface and to cement the gage. The second difficulty is that the gages must be discarded after a single test and cannot be used again.

Because of these difficulties so-called unbonded strain gages have been developed (e.g. U.S. Patents Nos. 2,453,-549 and 2,036,458); but none of these, so far as I am aware, may be said to be quickly and easily applied. In what follows it will be clear that the presently described gage is easily and quickly applied, and the feature which makes this possible is the low operating force made possible by the basic invention involved in the gage.

Accordingly, it is a primary object of the invention to provide a strain gage of the unbonded type which can be quickly and easily applied to the surface of the body on which it is desired to measure the strain.

Another object is to provide a strain gage which is readily removable from the surface of the body after use and which is not harmed or distorted during use, and therefore is capable of being used repeatedly.

The invention is featured by the provision of an appropriately mounted pair of lever arms whose lower ends are provided with sharp points for engagement with the surface of the body the strain of which is to be measured. The levers are hinged to each other intermediate the ends for swinging movement in a single vertical plane, and each carries at least while the test is proceeding a binding post at its upper end around which is passed a resistance wire adapted to form one branch of a Wheatstone bridge so that changes in its internal resistance may be accurately measured. One of the binding posts, however, is mounted to permit isolation from its corresponding lever arm to avoid accidental overstraining of the wire or to permit restoration of the device to zero for stepwise measurement of large displacements. For this purpose such post is held on a draw bar associated with one of the levers, the draw bar being adapted either to be locked rigidly to its lever arm or to be disconnected therefrom so that the tension on the wire is substantially constant irrespective of pivotal movement of either or both lever arms. In one form of the invention the means for locking the draw bar comprises a manually operable set screw which releasably clamps the draw bar to its lever arm. In another form of the invention I may use electromagnetic clamping means for gripping the draw bar tightly when energized but including resilient means releasing the draw bar when deenergized.

Still further features, objects and advantages of the invention will become apparent from the following detailed description of a presently preferred embodiment thereof taken in conjunction with the accompanying drawings in which like numerals refer to like parts in the several views and in which, Fig. 1 is a diagrammatic representation of a pair of lever arms and a resistance wire illustrating the principle of operation of the strain gage according to the invention;

Fig. 6 is a plan view of the same, with portions broken away;

Fig. 7 is an end view of the same with portions broken away and partly in section;

Fig. 8 is an end view, on a reduced scale, of the novel gage showing the same as applied to measure longitudinal strains in the surface of a cylindrical body;

Fig. 9 is a view in side elevation of the novel gage as applied to a non-magnetic surface by the use of a suction cup mounting device;

Fig. 10 is a view in perspective showing a somewhat modified form of a draw bar for use in the embodiment shown in Fig. 11;

Fig. 11 is a view in side elevation, with parts broken away, showing a portion of a modification of the invention employing electromagnetic means for clamping the device to the test surface and electromagnetic means for clamping the special draw bar shown in Fig. 10 to its lever arm; and Fig. 12 is a fragmentary vertical sectional view taken on line 12—12 of Fig. 11.

Figure 1:
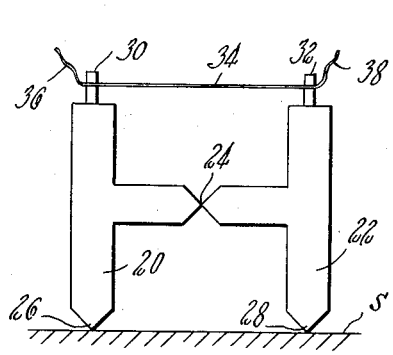

The principle of operation of the unbonded strain gage of this invention is illustrated in Fig. 1. It is desired to measure the strain on the surface S. The strain gage comprises two levers 20 and 22 which are pivoted to each other at 24 and whose lower ends 26 and 28 are sharp and are held firmly against the surface S by any suitable means. In the upper ends of the levers are two binding posts 30 and 32 which are insulated electrically from their respective lever arms. Stretched between the binding posts with an initial predetermined tension is the resistance wire 34 from which wires 36 and 38 lead to instruments for measuring the change in resistance of the wire 34. If the surface S is strained in compression the wire 34 is strained further in tension, and its resistance increases. When the surface S is strained in tension the wire 34 experiences a reduction in its tensile strain and a corresponding decrease in its resistance. It may be seen that the reason for the initial tension in the wire 34 is the requirement that it accommodate a compression strain increment when the surface S is strained in tension; without the initial tension the wire would merely have slack when the surface S has a tensile strain.

If the system shown in Fig. 1 is going to be easily applied it can be taken almost as axiomatic that its operating force must be small. The operating force available will depend upon how hard the points 26 and 28 are held against the surface S. Obviously, if these points need be pressed against the surface only very lightly this opens up the possibility of use of a number of methods of attachment (e.g., magnets, suction cups) which are not feasible if a large force is required. The operating force will be kept as low as possible by making the resistance element 34 of as few strands as possible, and of wire of the smallest feasible diameter, or, in other words, to make it as "weak" as possible.

Conveniently I have found it desirable to make the initial tension in the resistance wire 34 such that there will be a tensile strain of approximately .002 inch per inch. The wire then should be such that it can withstand a strain of .004 or .006 inch per inch without permanent stretching. If the wire should be strained as much as .01 inch per inch and then unloaded it would be found that it had stretched permanently, and large straining of the wire will cause fracture.

If the resistance wire is designed to be very weak, then there are difficulties with mounting the gage in the manner shown in Fig. 1. Assume that the "gage length," i.e. the distance between the points 26 and 28, is .50 inch, which is a desirable value for general utility. If the hinge point 24 is at the mid-height of the lever arms and the wire 34 also is .50 inch long, then an initial strain of .002 inch per inch will be equivalent to a relative movement of the points 26 and 28 of .001 inch. Thus, if in the act of mounting the gage on the surface the points 26 and 28 are moved apart .001 inch, then there will be no initial tension in the wire. Alternatively, if, in mounting, the points 26 and 28 are moved together as much as .005 inch then the resistance wire 34 will be permanently stretched. It will be apparent that it would be difficult, if not impossible, to mount the gage shown in Fig. 1 without either leaving the wire 34 slack or stretching it permanently, since the relatively weak wire used makes it very easy to displace the points 26, 28 relative to each other.

Figure 2:
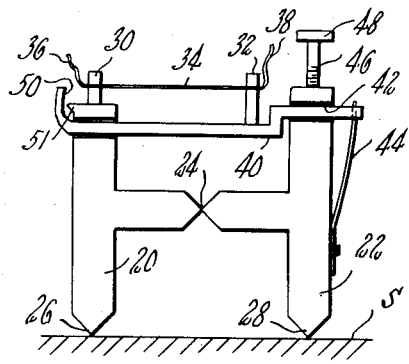
Fig. 2 is a similar view illustrating the novel draw bar and one form of releasable clamping means for clamping the draw bar to its lever arm.

According to the present invention I circumvent this problem by the arrangement shown in Fig. 2. In Fig. 2 the binding post 32 is attached to a draw bar 40 which passes through a hole 42 in the lever arm 22. The draw bar 40 is connected to the lever arm 22 by a spring 44 of such size and elongation as to produce the desired initial tension force in the wire 34. A set screw 46 can be tightened by knob 48 to lock the draw bar 40 firmly to the lever arm 22. When mounting this gage the screw 46 is loose and the draw bar 40 is free to slide in the hole 42 in the lever arm 22. If, in mounting, the points 26 and 28 are moved relative to each other, this movement is accommodated by a flexing of the spring 44, whose spring constant is much less than that of the wire 34 with which it is in series. The flexing of the spring 44 is accompanied by a movement of the draw bar 40 relative to the lever arm 22. The spring 44 is designed so that there is a very small percentage change in the initial tension force due to the movement of the points 26 and 28 during mounting. After the gage has been mounted on the surface the screw 46 is tightened, locking the draw bar 40 to the lever arm 22, and the system is functionally the same as that shown in Fig. 1. When the test is finished the screw 46 is loosened, releasing the draw bar, and the gage is then removed from the surface. Overtravel of the bar 40 is prevented by the safety stop 50 cooperating with a protuberance 51 on the lever arm 20.

A basic feature of the invention is the provision of the soft spring 44 in series with the wire 34, together with means for isolating the spring relative to this wire when such is desired. The spring serves the dual purpose of providing required initial tension in the resistance wire and of protecting this wire by absorbing extensions and contractions during the mounting process.

Figure 3:
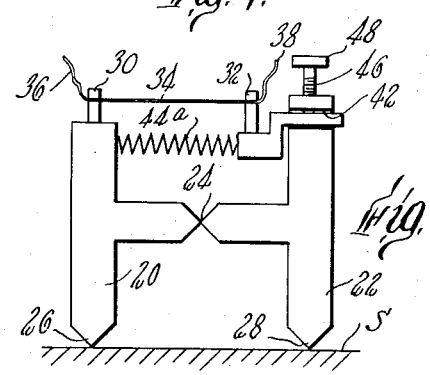
Fig. 3 is a view similar to Fig. 2 of a somewhat modified form of the invention.

An alternative arrangement according to the invention, accomplishing the same purpose, is shown in Fig. 3. Here the spring 44 of Fig. 2 has been replaced by a compression spring 44a which acts in parallel with the wire 34. In this arrangement there is no connection between the wire 34 and the lever arm 22 during the mounting process, and the spring 44a serves the single purpose of providing the initial tension in the wire 34. After the gage is mounted there is zero horizontal force acting between the gage points 26 and 28 and the surface. When the surface is strained there is a horizontal force generated between the contact points 26 and 28 and the surface and this force is proportional to the amount of strain and its direction depends on the direction of strain. In the arrangement shown in Fig. 2, however, there always is a horizontal force on the points 26 and 28, the force on one point being directed toward the other point. When the surface is strained in tension, this force decreases and when the strain is compressive, the force increases, always remaining in the same direction. It thus may be said that an advantage of the arrangement of Fig. 3 over that of Fig. 2 is that the operating force of the former is, on the average, less than half that of the latter. Whether this will mean that the Fig. 3 arrangement will be selected in a given design will depend upon a consideration of all factors in the particular situation. A safety stop like 50, 51 in Fig. 2 may optionally be included in the embodiment of Fig. 3.

Figure 4:
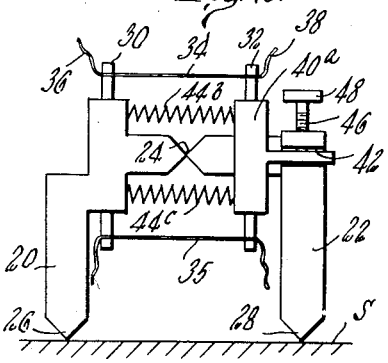
Fig. 4 is a view of a still further modification of the invention employing a pair of resistance wires.

A third arrangement according to the invention is shown in Fig. 4. Here there are two resistance wires, 34 and 35, and two springs, 44b and 44c, and a modified draw bar 40a. The advantage of this design is that the resistance changes in the wires 34 and 35 are equal and of opposite sign. If these wires are put in adjacent arms of the Wheatstone bridge used to measure the resistance change, the output of the bridge circuit will be double that with but the single wire 34 of Figs. 2 or 3. Further, when in adjacent arms of the bridge there will be a limited temperature compensation: any change in temperature of the surrounding air will change the temperature of both wires 34 and 35 the same amount and the resistance changes due to this will cancel each other and result in zero output of the bridge circuit. The arrangement shown in Fig. 4 offers some theoretical advantages but introduces difficult mechanical problems, particularly of construction with corresponding increased cost of production. The arrangements shown in Figs. 2 and 3 may be considered preferred forms of the invention under certain conditions as compared with that shown in Fig. 4.

Another feature of the embodiment illustrated in Figs. 2 and 3 is that it can be used to measure large strains with accuracy. When the strain of the surface has been increased to the limit imposed either by the initial tension in the wire or by the strain at which the wire will deform permanently, the gage can be "reset" by momentarily loosening and then tightening the screw 46. This action restores the initial tension in the wire and it now is in condition to measure another increment of strain. In this manner large strains can be measured in increments. The limit on accuracy will be imposed by the geometry of the gage, and not by the characteristics of the strain wire 34; if the lever arms 20 and 22 are made long relative to the gage length (distance between points 26 and 28) then the accuracy can be very high.

In addition to the basic elements shown in Fig. 2, other parts must be added to have a complete and practical unbonded gage for use in the field. It is necessary to provide means for accurately holding the gage points 26 and 28 at the proper gage length, means for holding such points against the straining surface, and means for temperature compensation due to change in air temperature or gusts of air flowing past the resistance wire. The particular forms of these means described below are by way of illustration and may be modified by those skilled in the art, nevertheless within the scope of the invention. The overtravel safety stop 50 has been included to protect the resistance wire in the event that the user forgets to loosen the screw either before mounting the gage or before removing it.

Figure 5:
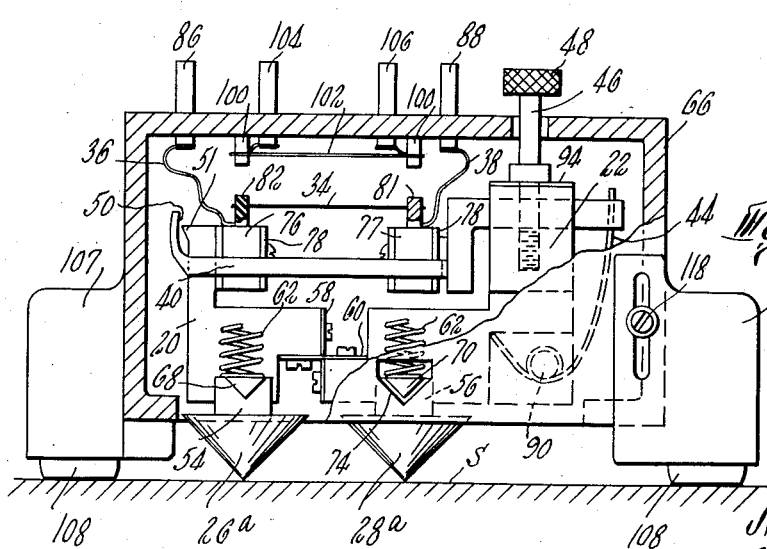
Fig. 5 is a view in side elevation, with portions broken away and partly in section, showing the complete assembly of a strain gage according to the embodiment shown in Fig. 2.

In Figs. 5, 6 and 7 are shown three views of one form of my complete gage according to the invention. The points 26a and 28a screw into the bases of the lever arms 20 and 22 and at the same time hold the cross-bars 54 and 56 firm against the lever arms. The elastic hinge between the two lever arms is made with two crossed strips 58 and 60 of thin, resilient metal. Springs 62 act between the cross-bars 54, 56 and clips 64 which are fastened to the sides of the case 66 (Fig. 7). When the gage is not mounted on a surface the springs 62 force knife edges 68, 70 on the ends of cross-bars 54, 56 into V-shaped grooves 72, 74 in the sides of the case 66, thus maintaining the points 26a and 28a at the proper gage length. Metal blocks 76, 77 are electrically insulated from the lever arm 20 and the draw bar 40 by the thin insulating sheets 78. Mounted in block 76 are an electrically conductive metal binding post 80 and a non-conducting binding post (sapphire) 82. Similarly mounted in the block 77 are a metal post 81 and a sapphire post 83 (Fig. 6). The resistance wire 34 is fastened (as by soldering, welding, or by mechanical means) to the binding posts 80 and 81 and passes around the posts 82 and 83. Flexible wires 36 and 38 lead to binding posts 86 and 88 on the outside of the case 66. The draw bar 40 passes through a hole 42 in the lever arm 22. A spring 44 is mounted on a mandrel 90 and the end of the spring exerts a tensile force on the end surface of the slot 92 of the draw bar 40. A flexible plate 94 holds a block 96 centered above the draw bar 40 in the hole 42 in the lever arm 22. The screw 46 passes through the slot 92 in the draw bar 40 into a threaded hole in the lever arm 22. When the screw 46 is tightened by turning the knurled knob 48 the plate 94 deflects and the block 96 locks the draw bar 40 firmly in contact with the lever arm 22. The over travel safety hook 50 is fastened to the draw bar 40. In manufacture, just prior to installation of the resistance wire 34 a thin piece of metal, about .0015 inch thick, is placed between the safety hook 50 and the protuberance 51. This piece of metal is removed after the resistance wire has been installed, leaving a gap which is safely within the elastic range of the resistance wire. Should a large tensile force accidentally be applied to the resistance wire, the safety hook 50 will engage the protuberance 51 and prevent elongation greater than the established gap. In this manner the hook 50 constitutes an additional safety feature. (The contour of this hook 50 preferably is designed so that the same gap is maintained even for rather large motion of the draw bar 40 relative to the lever arm 22, or, to say the same thing, for very large strains.) Binding posts 100 are mounted on the inside of the top of the case 66 and a resistance wire 102, of equal length with wire 34, is stretched between these posts. The ends of the wire 102 are connected to the binding posts 104 and 106 on the top of the case. The purpose of this wire 102 is to provide temperature compensation for ambient air changes, and it is intended that the wires 34 and 102 be mounted in adjacent arms of a Wheatstone bridge circuit when the gage is used.

Finally, mounted on the outside ends of the case 66 in vertically adjustable holders 107, are magnets 108 (here shown as permanent). The holders 107 are clamped to the case 66 by screws 118. The magnets are attached to the case 66 so that when the knife edges 68, 70 are firmly seated in the V-shaped grooves 72, 74 and the points 26a, 28a touching the surface S, there will be an air gap of about .07 inch between the bottom surfaces of the magnets and the surface S. One of the magnets should be articulated slightly (in a manner not shown) to accommodate surfaces which are not plane. Provision may be made for mounting the magnets on the side as an alternative when this is desired because of space or other considerations.

In operation, to use the gage on a material which is magnetic, the procedure is as follows. The screw 46 is loosened. The points 26a and 26b are held lightly against the surface in the proper orientation. The case is then shoved against the surface and the magnets 108 will hold it there. In the installation process the V-shaped grooves 72, 74 move away from the knife edges 68, 70 leaving the two lever arms connected to the case only through the compression springs 62. The screw 46 now is tightened. The binding posts 86, 88, 104 and 106 are connected to the appropriate instruments and the test is begun. To remove the gage the screw 46 is loosened and the case is then pulled away from the surface.

Referring now to Fig. 8, an arrangement is shown for measuring strain on the surface of a cylindrical rod 110. This may be done by the use of a U-shaped piece 111 having a V-shaped groove 112 adapted to receive the cylindrical rod 110 and having magnetically conductive pieces 114, 116 on the ends of its two arms arranged to cooperate with the magnets 108. In use the gage is placed on one side of the rod 110 with the points 26a and 28a in alignment axially of the rod. The auxiliary member 111 is placed on the opposite side of the rod with the rod fitting into the V-shaped groove 112. The position of the magnets 108 may be varied by loosening the set screws 118 and retightening so that the points 26a, 28a will be held firmly against the surface S while the test is in progress.

A mounting arrangement is shown in Fig. 9 for using the novel strain gage according to the invention on surfaces of non-magnetic material. Here as in the case of Fig. 8, an auxiliary device is used for firmly holding the gage. The device consists of a pair of suction cups 120 mounted at opposite ends of a metallic strip 122 of magnetic material. The suction cups are mounted on the strip 122 by means of mounting bolts 124 in a manner which will be apparent to those skilled in the art. The strip 122 is provided with a central flattened portion 122a having a central aperture 126 through which the points 26a, 28a may protrude. In operation the suction cup device is first attached to the surface S, the height of the magnets 108 is adjusted by loosening the screws 118 and reclamping at the desired level, and the gage is then placed in engagement with the surface S being held magnetically to the strip 122 with the points 26a, 28a protruding through the opening 126. An alternative method to test non-magnetic surfaces is to glue small iron pieces to the surface with a fast drying cement; the magnets then can pull down and fasten to these small iron pieces and the suction cups are eliminated.

In the embodiment of Figs. 10–12 electromagnets 108a having windings 126 have been substituted for the permanent magnets 108. Also in this embodiment of the invention an electromagnetically operated clamping means has been substituted for the screw-operated clamp 46, 94 of the previous embodiments. A specially shaped draw bar 40a provided with binding posts 81, 83 is slidably mounted in a slot 128 cut in the top of the lever arm 22a. The cutting of the slot 128 leaves spring jaws 130, 133, a form of split nut, normally disengaged from the draw bar 40a. A solenoid 132 is so mounted as when energized to actuate a plunger 134 pulling downwardly on the resilient jaw 130, thereby clamping the draw bar 40a against sliding movement. Some mechanical advantage is obtained in clamping the bar because of the special arrangement. The windings 126 and 132 may be energized from the line 136 by operation of appropriate switches (not shown). In the operation of the embodiment of Figs. 10-12 during transportation and initial placing on the surface S the electromagnets are de-energized. In such condition the draw bar 40a is free to move and there is no danger of overstraining the resistance wire. Next the power is turned on and the winding 126 is energized to hold the gage to the surface S. This closes the switch 138 which energizes the winding 126 to activate the armature 134 pulling down on the jaw 130 and clamping the draw bar 40a to its lever arm 22a.

The electromagnetic system has the advantage that the lever arms do not have to be touched after the gage is mounted. Further, by providing a separate switch (not shown) for winding 132, it allows quick resetting of the gage to measure successive increments when large strains are being measured. Also, resetting may be done by remote control at a position distant from the gage, a convenience in many cases.

The gage of this embodiment easily could be waterproofed by use of a flexible waterproof membrane through which the points would protrude and which would be bonded to the points to prevent leakage. A gage waterproofed in this way could be used outdoors with convenience and assurance of stability in the electrical operating characteristics of the gage.

The novel gage of the invention will not give by itself complete temperature compensation. To obtain complete temperature compensation it is necessary to mount a second identical gage on a block of metal of the same material as the surface on which the strain is to be measured. Temperature compensation thus will be obtained if the resistance wires of the two gages are put in adjacent arms of a Wheatstone bridge. This procedure is identical with the standard practice for temperature compensation of bonded wire strain gages.

It is of course possible to modify the gage so that its temperature behavior may be calibrated and allowed for in any specific application. This may be done by mounting thermocouples in the gage and on the surface which is to be strained. The gage is first calibrated by measuring its output when mounted on an unloaded and unrestrained block of metal of the same material as the surface, and when the temperature of this block is varied. When the gage is thereafter used to measure strains on the actual surface, the strain due to stress is found by subtracting from the total output of the gage the calibration strain corresponding to the correct temperature of gage and surface.

From the foregoing, it will be seen that, according to the invention, I have provided a new and improved unbonded type of strain gage having the particular advantages of ready attachment to and removal from the surface of the body to be tested in such a manner as to be non-injurious of the device so that it may be used over and over again. An important feature of the invention is the special arrangement of the draw bar and lever arms, safeguarding the resistance wire against overstraining and permitting the use of a spring for placing the resistance wire under an initial predetermined tension so that both positive and negative strains in the surface may be measured. Other special features and advantages will be apparent from the foregoing description. While I have illustrated and described presently preferred embodiments of the invention, it will nevertheless be understood that the same is susceptible of various modifications and changes by those skilled in the art nevertheless within the scope of the invention. Therefore, the invention is limited only by the proper scope to be afforded the appended claims.

I claim:
1. A strain gage comprising first and second spaced generally parallel lever arms hinged to each other for independent pivotal movement within their common plane, said arms at one end thereof being provided with sharp points for engagement with the strained surface, a member movably mounted on the first of said arms for relative movement with respect to said first arm in a direction toward and away from said second arm, a resistance wire stretched between said second arm and said movable member, an adjustable clamping device for clamping said member to said first arm when said points are disposed in gaging position and otherwise to permit relative movement of said member with respect to said first arm, and biasing means acting on said movable member to urge the same in a direction away from said second arm.

2. A strain gage as defined in claim 1 in which said movable member comprises a draw bar extending through an aperture in said first arm, and in which said biasing means comprises a spring which is softer than said resistance wire.

3. A strain gage as defined in claim 2 in which said spring comprises a tension spring acting between said first arm and a portion of said draw bar.

4. A strain gage as defined in claim 2 in which said spring comprises a compression spring acting between said second arm and a portion of said draw bar.

5. A strain gage as defined in claim 3 in which said draw bar also extends beyond said second arm and is provided with an abutment coacting with a portion of said second arm to prevent overtravel of said bar in a direction toward said first arm.

6. A strain gage as defined in claim 2 in which said clamping device comprises a set screw mounted on said first arm and adapted to engage the portion of said draw bar which passes through said aperture.

7. A strain gage as defined in claim 2 in which said clamping device comprises a clamping member adapted to engage a portion of said draw bar and a solenoid adapted when energized to press said clamping member against said portion of said draw bar.

8. A strain gage comprising a casing, first and second spaced generally parallel lever arms mounted within said casing hinged to each other for independent pivotal movement within their common plane, each of said arms at the lower end thereof engaging a bar which extends transversely within the casing and is provided at both ends with knife-edge portions adapted to engage corresponding portions of said casing to limit downward movement of said arms and locating the lower ends of said arms at a predetermined distance from each other when so engaged, a sharp projection connected to each of said bars and extending downwardly beneath said casing for engagement with the strained surface, a draw bar held in apertures in both of said arms for relative movement with respect to said first arm in a direction toward and away from said second arm, a resistance wire stretched between said second arm and said draw bar, a clamping device for releasably clamping said draw bar to said first arm while the gage is in use, and a tension spring connected between said first arm and said draw bar urging the same in a direction away from said second arm.

9. A strain gage as defined in claim 8 including springs acting between portions of said casing and said transverse bars urging said knife edge portions into their engaged position.

References Cited in the file of this patent

UNITED STATES PATENTS

| 2,681,566 | Ruge | June 22, 1954 |
| 2,697,158 | Epstein et al. | Dec. 14, 1954 |
| 2,785,470 | Epstein et al. | Mar. 19, 1957 |